United States Patent [19]

Iso

[11] Patent Number: 5,692,079
[45] Date of Patent: Nov. 25, 1997

[54] MULTIFIBER CONNECTOR

[75] Inventor: Takaaki Iso, Ichihara, Japan

[73] Assignee: The Furukawa Electric Co., Ltd., Tokyo, Japan

[21] Appl. No.: 720,669

[22] Filed: Oct. 2, 1996

[30] Foreign Application Priority Data

Oct. 11, 1995 [JP] Japan ................................. 7-262767

[51] Int. Cl.$^6$ ............................. G02B 6/00; G02B 6/36
[52] U.S. Cl. ............................................................ 385/59
[58] Field of Search ................................. 385/59, 63, 71, 385/75; 356/73.1, 239, 394, 372, 375; 156/153, 257, 264, 296

[56] References Cited

U.S. PATENT DOCUMENTS

| | | | |
|---|---|---|---|
| 4,818,059 | 4/1989 | Kakii et al. | 385/65 |
| 4,830,456 | 5/1989 | Kakii et al. | 385/75 |
| 4,952,263 | 8/1990 | Kakii et al. | 385/75 |
| 5,028,112 | 7/1991 | Holmberg et al. | 385/88 |
| 5,117,557 | 6/1992 | Yamane | 356/73.1 |
| 5,124,730 | 6/1992 | Nagasawa et al. | 385/59 |
| 5,220,407 | 6/1993 | Yamane et al. | 356/73.1 |

FOREIGN PATENT DOCUMENTS

| | | |
|---|---|---|
| 0 241 724 | 10/1987 | European Pat. Off. . |
| 0 271 721 | 6/1988 | European Pat. Off. . |
| 0 323 920 | 7/1989 | European Pat. Off. . |

OTHER PUBLICATIONS

Journal Of Light Wave Technology, vol. 6, No. 2, Feb. 1988, New York, U.S.A., PGS. 269–272, T. Satake et al "Very Small Single–Mode Ten–Fiber Connector".

*Primary Examiner*—Akm E. Ullah
*Attorney, Agent, or Firm*—Frishauf, Holtz, Goodman, Langer & Chick

[57] ABSTRACT

A multifiber connector comprises a ferrule having a pair of pin holes formed therethrough at a predetermined distance from each other for receiving guide pins, respectively, in such a manner that a predetermined length of each guide pin is projected from the ferrule in a direction of butt-connection, and a regulating member arranged at the rear of the ferrule for regulating the lengths of projection of the guide pins, wherein the ferrule and the regulating member are contained in a housing. A pin retaining member having elasticity is arranged between the ferrule and the regulating member and has a center opening. The pin retaining member also has a pair of slits corresponding in position to the respective pin holes, or a slit and a retaining hole corresponding in position to the respective pin holes. The pair of slits or the slit and the retaining hole are located on opposite sides of the opening. Each slit extends outward along a line passing through the centers of the pin holes and has a width smaller than the diameter d of the guide pin, and the retaining hole has a diameter D smaller than the diameter d of the guide pin.

10 Claims, 5 Drawing Sheets

MULTIFIBER CONNECTOR

BACKGROUND OF THE INVENTION

1. Field of the Invention

The present invention relates to a multifiber connector wherein a ferrule, which is set in position by means of two guide pins, is provided with a housing so as to permit one-push connection.

2. Description of the Related Art

An outline of a one-push connection type multifiber connector will be explained. As shown in FIG. 5, a ferrule 1 has two pin holes 1a cut therethrough at opposite sides with respect to its width, and a retaining block 3 made of synthetic resin is attached to the rear part (lower part as viewed in the figure) of the ferrule 1 for retaining guide pins 2, 2. The retaining block 3 has a center opening 3a for receiving a boot 1b of the ferrule 1, retaining holes 3b, 3b formed on opposite sides of the opening 3a and each having a diameter slightly smaller than the diameter of the guide pin 2, and slits 3c extending outward in the width direction from the respective retaining holes 3b.

With the guide pins 2 inserted through the respective pin holes 1a of the ferrule 1, the retaining block 3 and a compression spring are interposed between the ferrule 1 and a stopper, not shown, and the ferrule 1, the retaining block 3, the compression spring and the stopper are contained in a housing, not shown, whereby the multifiber connector is assembled.

This multifiber connector is butt-connected to another multifiber connector with the guide pins 2 inserted into corresponding pin holes 1a of a mating ferrule 1.

In this case, the two requirements mentioned below must be met in order to achieve reliable butt-connection of two multifiber connectors. The first requirement is that a predetermined length of each guide pin 2 should be projected from a butt-connection end face 1c of one ferrule 1, and the second requirement is that the guide pins 2 should be elastically retained by the ferrule 1 and not come off from the ferrule 1.

In the aforementioned multifiber connector, to meet these requirements, the length of projection of each guide pin 2 is determined by the depth of each retaining hole 3b in the retaining block 3 attached to the rear part of the ferrule 1, and the guide pins 2 are elastically retained by the inner peripheral walls of the respective retaining holes 3b so as not to come off from the retaining block 3. Alternatively, the guide pins 2 may be securely fixed in the retaining holes 3b by adhesive.

Meanwhile, in the multifiber connector mentioned above, the retaining block 3 is an article produced by molding synthetic resin into a given shape, and therefore, it is difficult to set the diameter of each retaining hole 3b with accuracy and also to set the pitch of the two guide pins with accuracy.

If the diameter of the retaining hole 3b is too small, an end of the guide pin 2 does not reach the bottom of the retaining hole 3b, as shown in FIG. 6A, and the length of projection of the guide pin 2 is too large, with the result that the guide pin 2 fails to be held with a required retaining force. On the other hand, if the diameter of the retaining hole 3b is too large, as shown in FIG. 6B, the guide pin 2 received in the retaining hole 3b similarly cannot be held with the required retaining force and may possibly come off from the ferrule 1.

Further, in cases where the retaining block 3 is made of synthetic resin, it is difficult to set the distance between the retaining holes 3b, 3b with accuracy as mentioned above. Even if the retaining holes 3b at first have a proper diameter, they wear away and their diameters become large after repeated butt-connection of multifiber connectors, that is, after repeated insertion and removal of the guide pins 2, whose end portions are tapered, into and from the retaining holes 3b. As a result, the guide pins 2 are held with reduced retaining force and finally come off from the retaining block 3.

SUMMARY OF THE INVENTION

An object of the present invention is to provide a multifiber connector wherein the length of projection of each guide pin from the butt-connection end face can be maintained at a predetermined length and also the guide pins can be prevented from coming off even if butt-connection is repeated.

To achieve the above object, the present invention provides a multifiber connector comprising: a ferrule having a pair of pin holes formed therethrough at a predetermined distance from each other for receiving guide pins, respectively, in such a manner that a predetermined length of each guide pin received in the corresponding pin hole is projected from the ferrule in a direction of butt-connection; a regulating member arranged at the rear of the ferrule, for regulating the length of projection of each of the guide pins, the ferrule and the regulating member being contained in a housing; and a pin retaining member having elasticity and arranged between the ferrule and the regulating member, the pin retaining member having a center opening, and a pair of slits corresponding in position to the respective pin holes or a slit and a retaining hole corresponding in position to the pair of pin holes, respectively, the pair of slits or the slit and the retaining hole being located on opposite sides of the opening, each slit extending outward along a line passing through the centers of the pair of pin holes and having a width W ($0.8d<W<d$) smaller than the diameter d of the guide pin, the retaining hole having a diameter D ($0.8d<D<d$) smaller than the diameter d of the guide pin.

The pin retaining member serves to retain the guide pins by means of the pair of slits or the slit-retaining hole combination. The lengths of projection of the guide pins from the butt-connection end face of the ferrule are determined by the regulating member.

The pin retaining member preferably comprises a metal plate. In this case, wear of the pin retaining member at the slits or the retaining hole due to insertion and removal of the guide pins is lessened.

Preferably, the pin retaining member has a first slit with a width $W_1$ and a second slit with a width $W_2$ formed on each side of the opening, the second slit is located more outward than the first slit, and the widths $W_1$ and $W_2$ are set so as to satisfy the relations $0.8d<W_1<d$ and $W_2<W_1$, where d is the diameter of the guide pin.

As an alternative, the pin retaining member preferably has a first slit with a width $W_1$, a second slit with a width $W_2$ and a third slit with a width $W_3$ formed on each side of the opening, the first, second and third slits are continuously arranged outward in the order mentioned, and the widths $W_1$, $W_2$ and $W_3$ are set so as to satisfy the relations $0.8d<W_2<d$ and $W_1=W_3<W_2$, where d is the diameter of the guide pin.

As a further alternative, the pin retaining member preferably has a slit formed on each side of the opening, each of the slits extending from a corresponding side edge of the pin retaining member toward the opening and having a width W ($0.8d<W<d$).

Preferably, the regulating member has regulating holes formed therein at locations corresponding to the pair of pin holes, respectively, for setting the lengths of projection of the guide pins at a predetermined length, and the regulating holes each have a diameter larger than the diameter of the guide pin.

Alternatively, the regulating member preferably has regulating grooves formed therein at locations corresponding to the pair of pin holes, respectively, for setting the lengths of projection of the guide pins at a predetermined length, and the regulating grooves each have a width slightly greater than the diameter of the guide pin.

Preferably, the ferrule includes optical fibers extending rearward and a boot for protecting extended portions of the optical fibers.

Still preferably, the regulating member has a center opening formed therein for receiving the boot.

Further preferably, a compression spring is interposed between the regulating member and the housing.

According to a preferred embodiment of the present invention, the lengths of projection of the guide pins from the butt-connection end face can be maintained at the predetermined length, and also the guide pins can be prevented from coming off even if the butt-connection is repeatedly carried out.

In the case where the pin retaining member is made of a metal plate, wear of the pin retaining member at the slits or the retaining hole, at which the guide pins are elastically retained, due to insertion and removal of the guide pins can be lessened, thereby permitting a long-term use of the multifiber connector.

Further, with the multifiber connector of the present invention, even if insertion and removal of the guide pins are repeated, the force of retaining the guide pins scarcely lowers because the pin retaining member is elastically deformed at its slits. In the event a guide pin is accidentally bent, it can be readily replaced with a new guide pin, permitting the connection to be performed again.

The above and other objects, features, and advantages of the present invention will become apparent from the following description when taken in conjunction with the accompanying drawings.

DETAILED DESCRIPTION OF THE PREFERRED EMBODIMENTS

A multifiber connector according to one embodiment of the present invention will be hereinafter described in detail with reference to FIGS. 1 through 4.

Figure 1:
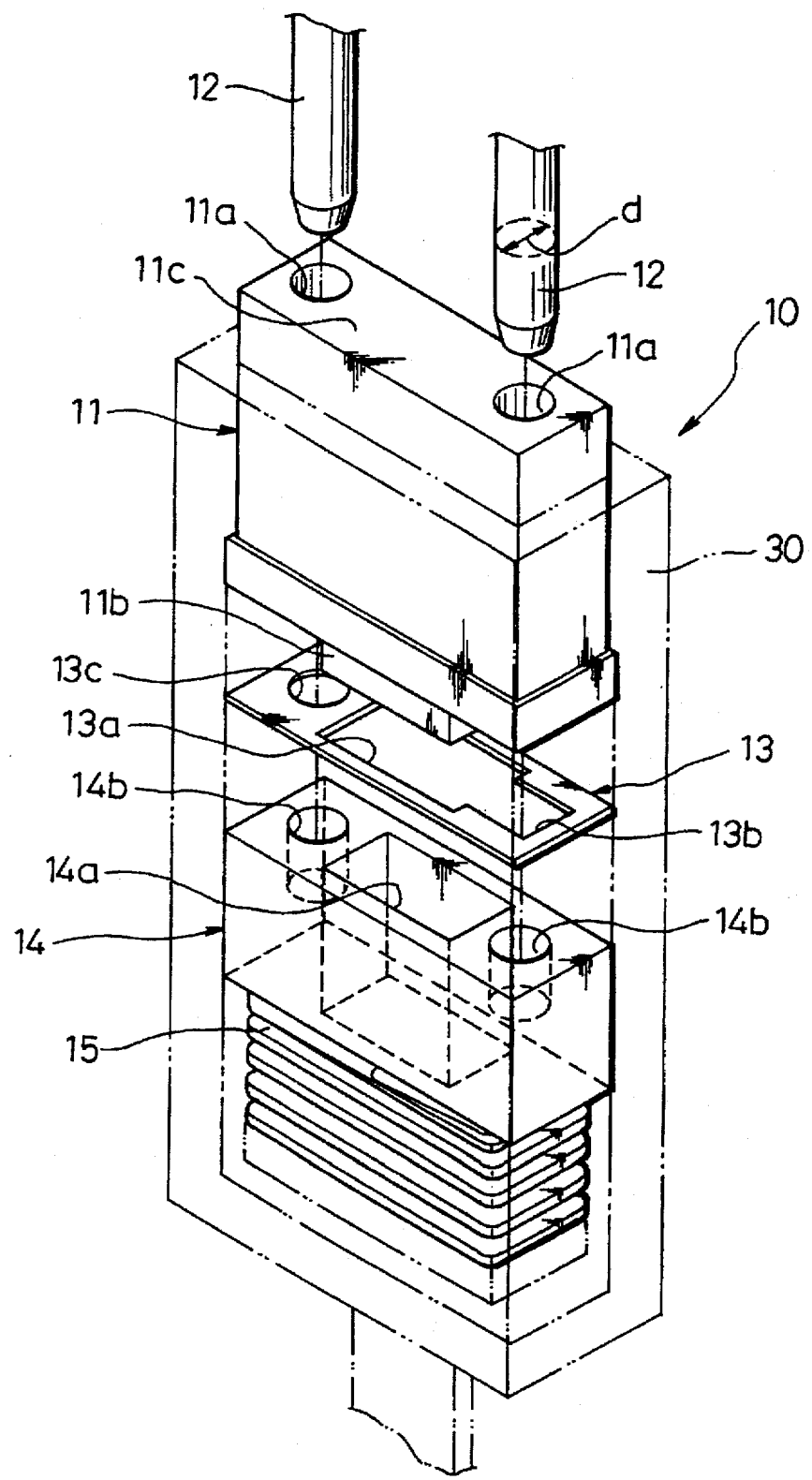
FIG. 1 is an exploded perspective view showing a principal part of a multifiber connector according to the present invention.
Figure 2:
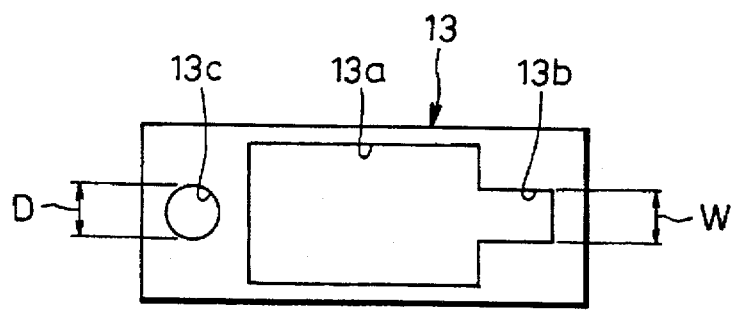
FIG. 2 is a plan view of a pin retaining member used in the multifiber connector of FIG. 1.

As shown in FIG. 1, a multifiber connector 10 has a ferrule 11, guide pins 12, 12, a pin retaining plate 13, a regulating block 14, and a compression spring 15. In the figure, the dashed line indicates a housing 30.

The ferrule 11 has two pin holes 11a formed at opposite sides with respect to its width and extending through the ferrule 11 in the direction of butt-connection, and has a boot 11b attached to its rear part. Each of the guide pins 12 has opposite end portions tapered, and is inserted at one end into the corresponding pin hole 11a.

The pin retaining plate 13 is a member for elastically retaining the guide pins 12 so as to prevent the guide pins 12 from coming off from the ferrule 11. The pin retaining plate 13 is interposed between the ferrule 11 and the regulating block 14, and comprises an elastic metal plate made of beryllium copper, phosphor bronze, stainless steel or the like. As clearly shown in FIG. 2, the pin retaining plate 13 has a center opening 13a for passing the boot 11b of the ferrule 11 therethrough, and also has a slit 13b and a retaining hole 13c formed on opposite sides of the opening 13a and corresponding in position to the respective pin holes 11a, 11a. The slit 13b extends outward from the opening 13a along a line passing through the centers of the pin holes 11a, 11a, and has a width W satisfying the relation $0.8d < W < d$, where d is the diameter of the guide pin 12 (see FIG. 1), though the width W may vary depending on the elasticity of the material used and the required retaining force. The retaining hole 13c has a diameter D satisfying the relation $0.8d < D < d$, where d is the diameter of the guide pin 12, for the same reason as mentioned above.

The width W of the slit 13b and the diameter D of the retaining hole 13c are set as aforesaid taking account of the range within which the pin retaining plate 13 is elastically deformable by the guide pins 12. Since the pin retaining plate 13 is made of a metallic material, the width W of the slit 13b and the diameter D of the retaining hole 13c can be set to values falling within the above respective ranges, so that the guide pins 12 can be elastically retained by the slit 13b and the retaining hole 13c, respectively. With this pin retaining plate 13, moreover. even in the case where the position of the guide pin 12 inserted through the slit 13b is slightly deviated relative to the other guide pin 12 inserted through the retaining hole 13c, such a deviation can advantageously be absorbed by the slit 13b.

The regulating block 14 serves as a member for regulating the lengths of projection of the guide pins 12 such that a predetermined length of each guide pin 12 is projected from the butt-connection end face 11c of the ferrule 11. The regulating block 14 has a center opening 14a for receiving the boot 11b of the ferrule 11, and also has regulating holes 14b, 14b formed on opposite sides of the opening 14a and each having a diameter greater than that of the guide pin 12. The guide pins 12 extending from the rear part of the ferrule 11 and passed through the slit 13b and the retaining hole 13c, respectively, of the pin retaining plate 13 have their ends abutted against the bottoms of the respective regulating holes 14b of the regulating block 14, whereby the lengths of projection of the guide pins 12 from the butt-connection end face 11c are determined. Thus, the primary function of the regulating block 14 is not to retain the guide pins 12 in its regulating holes 14b, but to set the lengths of projection of the guide pins 12 from the butt-connection end face 11c at a fixed value by means of the regulating holes 14b having the predetermined depth. For this reason, the diameter of each regulating hole 14b of the regulating block 14 and the distance between the regulating holes 14b, 14b may not be so accurate as in the conventional regulating block and may be set considerably roughly.

The compression spring 15 is produced by forming a wire with a circular cross section into helical form and is placed at the rear of the regulating block 14. The compression spring 15 and the other members are contained in the housing 30 indicated by the dashed line, whereby the multifiber connector is assembled.

In the multifiber connector 10 of the present invention having the above-described arrangement, the pin retaining plate 13, the regulating block 14 and the compression spring 15 are placed at the rear of the ferrule 11 having the guide pins 12 previously inserted through the respective pin holes 11a, and are assembled as shown in FIG. 1. The pin retaining plate 13 and the regulating block 14 can provide the following advantages that are not achieved by the conventional multifiber connector.

Specifically, when the multifiber connector 10 is assembled, with a jig (not shown) for pushing the guide pins 12 located on one side of the ferrule 11 close to the butt-connection end face 11c, the guide pins 12 are inserted into the respective pin holes 11a. Consequently, each guide pin 12 is inserted through the slit 13b or retaining hole 13c of the pin retaining plate 13 and its end becomes abutted against the bottom of the corresponding regulating hole 14b, whereby the length of projection of each guide pin 12 from the butt-connection end face 11c is set to a predetermined length corresponding to the depth of the regulating hole 14b. In this case, the pin retaining plate 13 is elastically deformed and retains the guide pins 12 at the slit 13b and the retaining hole 13c, respectively, and therefore, the guide pins 12 do not come off after the multifiber connector 10 is assembled. Also, since the pin retaining plate 13 is made of metal, it has high wear resistance compared with a synthetic resin-molded product and is not relieved of stress, permitting repeated insertion and removal of the guide pins 12.

In the case where the lengths of projection of the guide pins 12 from the butt-connection end face 11c need to be adjusted to different values, each regulating hole 14b may be formed so as to have a depth greater than the predetermined projection length. By stopping the insertion of the guide pins 12 with the aforementioned jig before their ends reach the bottoms of the respective regulating holes 14b, the lengths of projection of the individual guide pins 12 can be set to a desired length.

In the above embodiment, the pin retaining plate 13 has the slit 13b and the retaining hole 13c formed therein at locations corresponding to the respective pin holes 11a, 11a of the ferrule 11. The means for retaining the guide pins 12 are not limited to such a slit or hole, and may of course be of any other form insofar as they can elastically retain the guide pins 12.

Figure 3A:
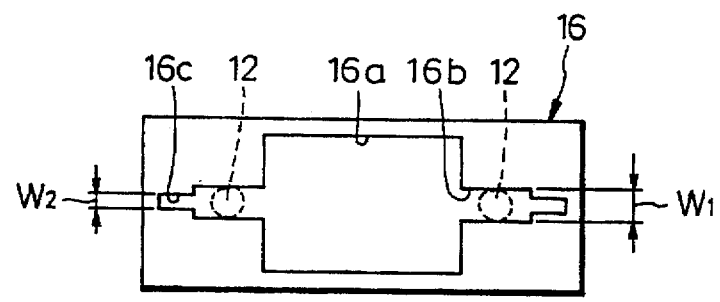
FIGS. 3A to 3C are plan views each showing a modification of the pin retaining member for the multifiber connector according to the present invention.

For example, a pin retaining plate 16 shown in FIG. 3A may be used which is an elastic metal plate having a center opening 16a and slits on both sides of the opening 16a. More specifically, first and second slits 16b and 16c are formed on each side of the opening 16a and extend outward along the line passing through the centers of the pin holes 11a, 11a. Each of the first slits 16b has a width $W_1$ satisfying the relation $0.8d<W_1<d$, where d is the diameter of the guide pin 12, though the width $W_1$ may vary depending on the elasticity of the material used and the required retaining force. The second slits 16c each have a width $W_2$ smaller than the width $W_1$ of the first slit 16b ($W_2<W_1$). As a result, the guide pins 12 can be retained in the respective first slits 16b with increased retaining force.

Figure 3B:
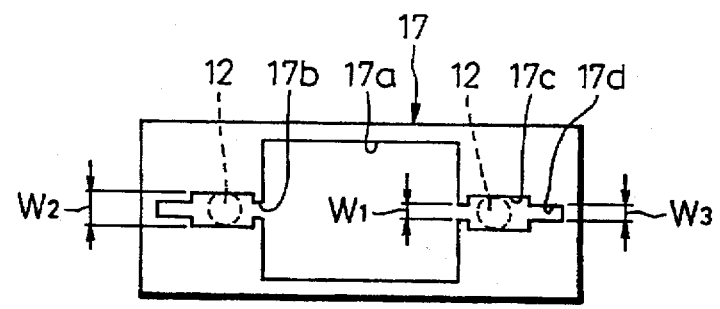

Further, a pin retaining plate 17 shown in FIG. 3B may be used which also is an elastic metal plate having a center opening 17a and slits on both sides of the opening 17a. More specifically, first, second and third slits 17b, 17c and 17d having widths $W_1$, $W_2$ and $W_3$, respectively, are formed on each side of the opening 17a and extend outward along the line passing through the centers of the pin holes 11a, 11a. The widths $W_1$, $W_2$ and $W_3$ are set so as to satisfy the relations $W_1=W_3<W_2$ and $0.8d<W_2<d$, and in this case, the retaining plate 17 is more liable to be elastically deformed at the second slits 17c for retaining the guide pins 12.

Figure 3C:
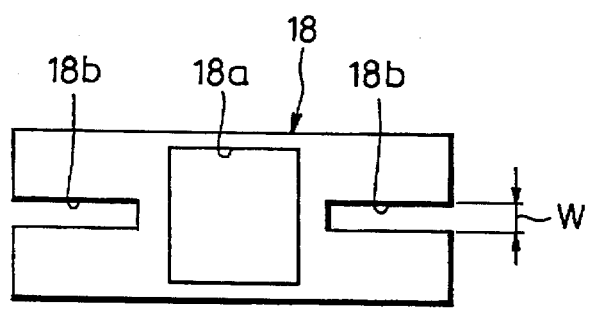

Also, a pin retaining plate 18 shown in FIG. 3C may be used, wherein slits 18b, 18b each having a width W are formed in an elastic metal plate on opposite sides of a center opening 18a so as to extend from the opposite side edges toward the opening 18a. Where the slits 18b are formed in this manner, the optical fibers inserted through the opening 18a do not interfere with the slits and the possibility of the optical fibers being damaged is lessened, as compared with the pin retaining plate having slits connecting with the center opening, such as the pin retaining plate 13 shown in FIG. 2 or the pin retaining plate 16 or 17 shown in FIG. 3A or 3B.

Figure 4:
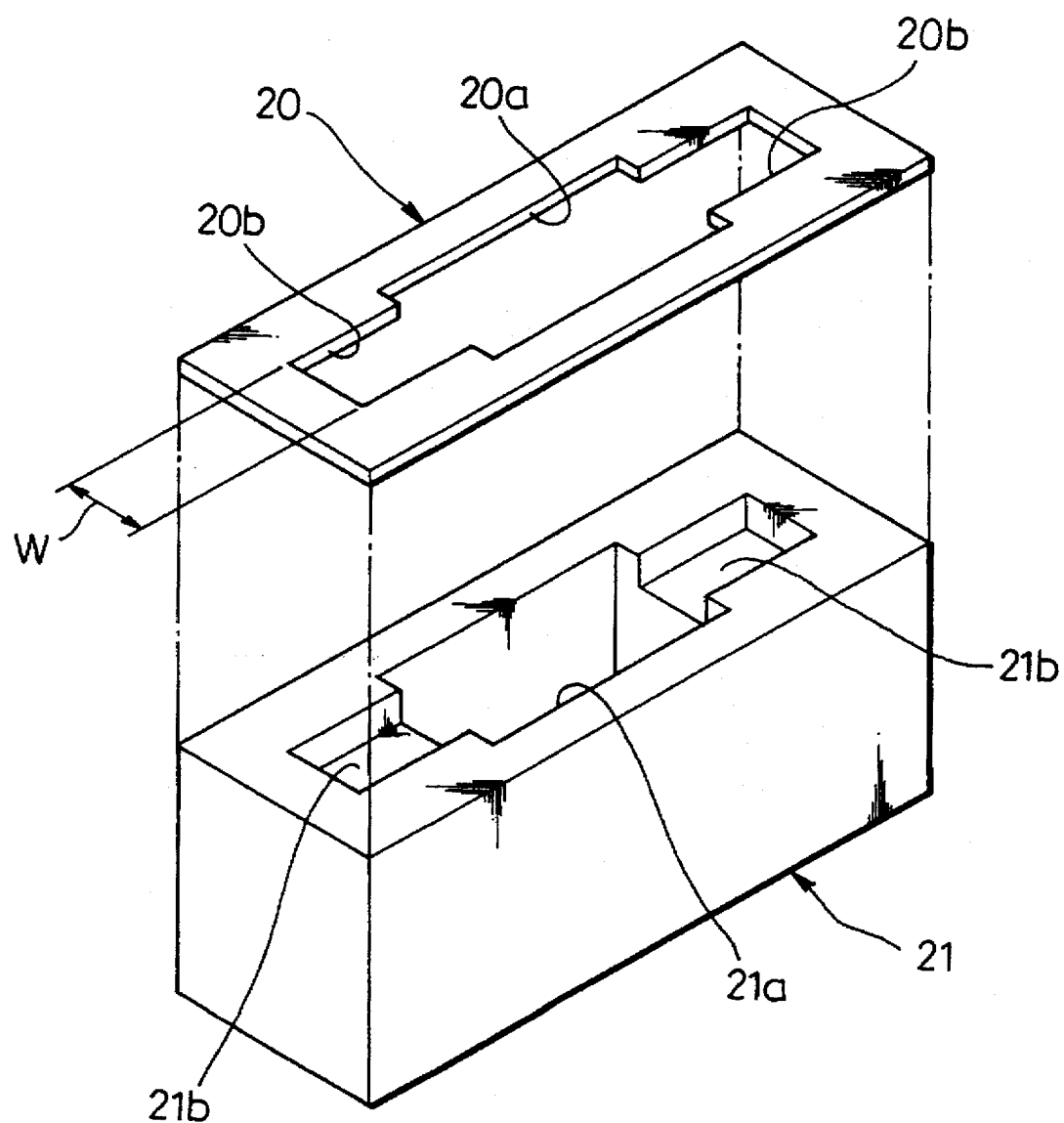
FIG. 4 is a perspective view showing a further modification of the pin retaining member and a regulating member.
Figure 5:
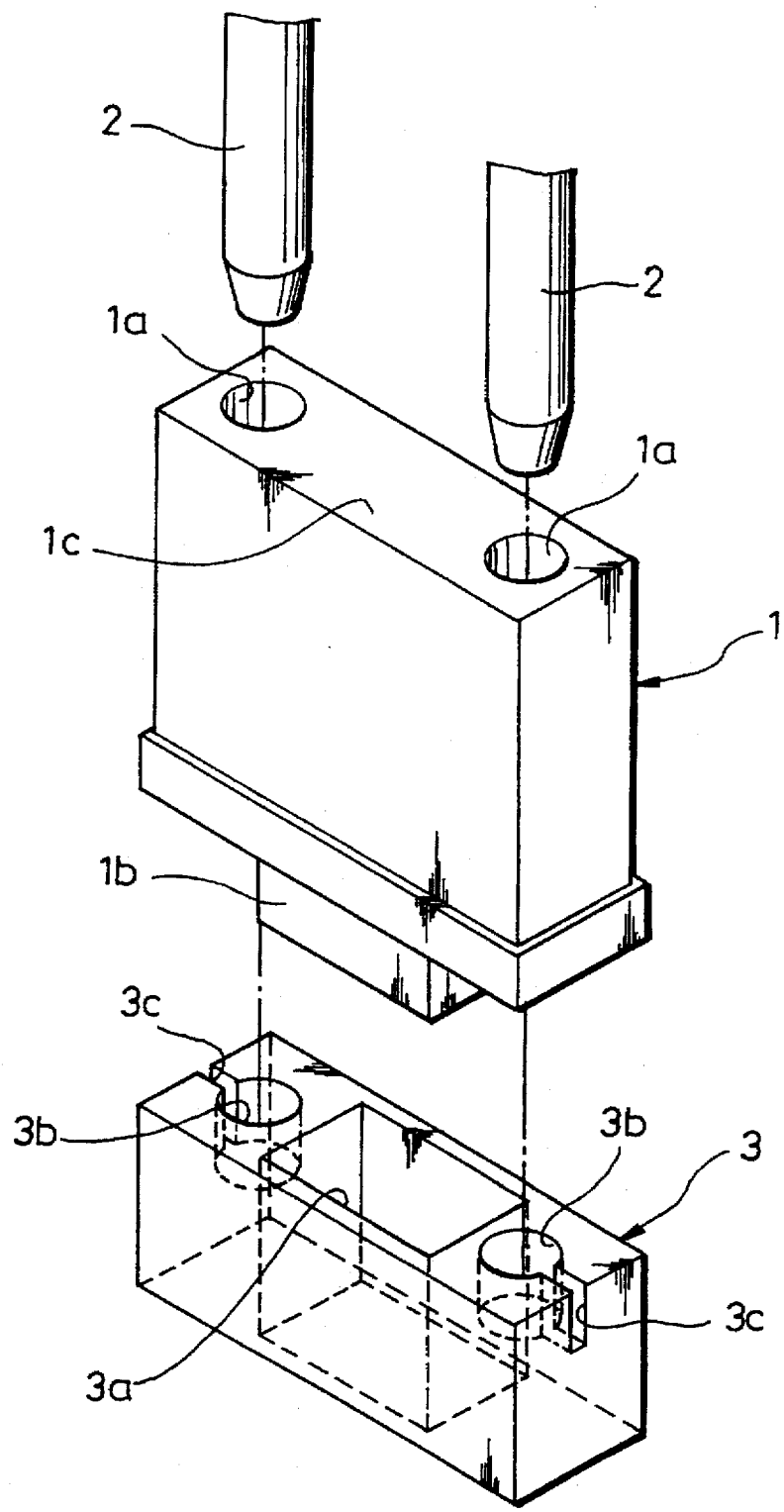
FIG. 5 is an exploded perspective view showing a principal part of a multifiber connector which is of a type similar to the present invention.
Figure 6A:
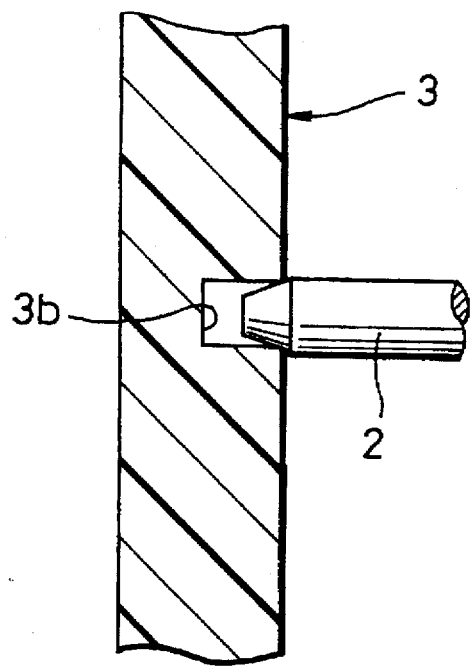
FIGS. 6A and 6B are sectional views each showing the relationship between a guide pin of a multifiber connector, which is of a type similar to the present invention, and a retaining hole cut in a retaining block for retaining the guide pin.
Figure 6B:
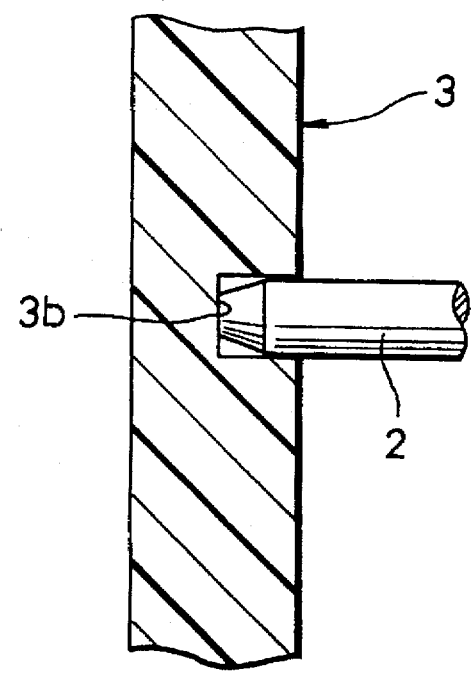

Further, a pin retaining member 20 and a regulating block 21 shown in FIG. 4 may be used as the pin retaining member and the regulating member, respectively. Specifically, the pin retaining member 20 is an elastic metal plate having a center opening 20a and slits 20b on opposite sides of the opening 20a, each slit 20b having a width W and extending outward from the corresponding side of the opening 20a along the line passing through the centers of the pin holes 11a, 11a. The width W of each slit 20b is set so as to satisfy the relation $0.8d<W<d$, where d is the diameter of the guide pin 12, though the width W may vary depending on the elasticity of the material used and the required retaining force. In the regulating block 21 are formed a center opening 21a for receiving the boot 11b of the ferrule 11 and regulating grooves 21b, 21b on opposite sides of the opening 21a. The regulating grooves 21b, 21b correspond in position to the respective pin holes 11a and each have a width slightly greater than the diameter of the guide pin 12. With this arrangement, the guide pins 12 can be retained by the pin retaining member 20 and also the lengths of projection of the guide pins 12 can be maintained at a predetermined length by the regulating block 21.

In the foregoing embodiment, the compression spring is placed at the rear of the regulating block; however, in cases where the regulating block may be pressed against the rear end of the ferrule solely by the housing, the compression spring can be omitted.

What is claimed is:

1. A multifiber connector comprising:
    a ferrule having a pair of pin holes formed therethrough at a predetermined distance from each other for receiving guide pins, respectively, in such a manner that a predetermined length of each guide pin received in the corresponding pin hole is projected from said ferrule in a direction of butt-connection;
    a regulating member arranged at a rear of said ferrule, for regulating the length of projection of each of the guide pins, said ferrule and said regulating member being contained in a housing; and
    a pin retaining member having elasticity and arranged between said ferrule and said regulating member, said pin retaining member having a center opening, and a pair of slits corresponding in position to the respective pin holes or a slit and a retaining hole corresponding in position to the pair of pin holes, respectively, the pair of slits or the slit and the retaining hole being located on opposite sides of the opening, each said slit extending outward along a line passing through centers of the pair of pin holes and having a width W (0.8d W<d) smaller than a diameter d of the guide pin, the retaining hole having a diameter D (0.8d<D<d) smaller than the diameter d of the guide pin.

2. The multifiber connector according to claim 1, wherein said pin retaining member comprises a metal plate.

3. The multifiber connector according to claim 1, wherein said pin retaining member has a first slit with a width $W_1$ and a second slit with a width $W_2$ formed on each side of the opening, the second slit being located more outward than the first slit, the widths $W_1$ and $W_2$ being set so as to satisfy relations $0.8d<W_1<d$ and $W_2<W_1$, where d is the diameter of the guide pin.

4. The multifiber connector according to claim 1, wherein said pin retaining member has a first slit with a width $W_1$, a second slit with a width $W_2$ and a third slit with a width $W_3$ formed on each side of the opening, the first, second and third slits being continuously arranged outward in the order mentioned, the widths $W_1$, $W_2$ and $W_3$ being set so as to satisfy relations $0.8d<W_2<d$ and $W_1=W_3<W_2$, where d is the diameter of the guide pin.

5. The multifiber connector according to claim 1, wherein said pin retaining member has a slit formed on each side of the opening, each of the slits extending from a corresponding side edge of said pin retaining member toward the opening and having a width W (0.8d<W<d).

6. The multifiber connector according to claim 1, wherein said regulating member has regulating holes formed therein at locations corresponding to the pair of pin holes, respectively. for setting the lengths of projection of the guide pins at a predetermined length, the regulating holes each having a diameter larger than the diameter of the guide pin.

7. The multifiber connector according to claim 1, wherein said regulating member has regulating grooves formed therein at locations corresponding to the pair of pin holes, respectively, for setting the lengths of projection of the guide pins at a predetermined length, the regulating grooves each having a width slightly greater than the diameter of the guide pin.

8. The multifiber connector according to claim 1, wherein said ferrule includes optical fibers extending rearward and a boot for protecting extended portions of the optical fibers.

9. The multifiber connector according to claim 8, wherein said regulating member has a center opening formed therein for receiving the boot.

10. The multifiber connector according to claim 1, which further comprises a compression spring interposed between said regulating member and said housing.

* * * * *